United States Patent [19]

Duyanovich et al.

[11] Patent Number: 5,835,954
[45] Date of Patent: Nov. 10, 1998

[54] TARGET DASD CONTROLLED DATA MIGRATION MOVE

[75] Inventors: Linda Marie Duyanovich, Saratoga, Calif.; William Frank Micka, Tucson, Ariz.; Robert Wesley Shomler, Morgan Hill, Calif.

[73] Assignee: International Business Machines Corporation, Armonk, N.Y.

[21] Appl. No.: 711,623

[22] Filed: Sep. 12, 1996

[51] Int. Cl.[6] .................................................. G06F 12/02
[52] U.S. Cl. .......................................... 711/162; 711/112
[58] Field of Search .................................. 711/161, 162, 711/111, 112, 113

[56] References Cited

U.S. PATENT DOCUMENTS

| | | | |
|---|---|---|---|
| 4,771,375 | 9/1988 | Beglin et al. | 364/200 |
| 4,855,907 | 8/1989 | Ferro, Jr. et al. | 364/300 |
| 5,155,845 | 10/1992 | Beal et al. | 395/575 |
| 5,321,826 | 6/1994 | Ushiro | 711/162 |
| 5,423,044 | 6/1995 | Sutton et al. | 395/725 |
| 5,564,037 | 10/1996 | Lam | 711/161 |
| 5,577,222 | 11/1996 | Micka | 711/112 |
| 5,623,669 | 4/1997 | Kincaid | 707/205 |
| 5,649,158 | 7/1997 | Ellsworth | 711/161 |
| 5,680,640 | 10/1997 | Ofek | 395/839 |

FOREIGN PATENT DOCUMENTS 63-237121  10/1988  Japan .

OTHER PUBLICATIONS

R.M. Laye et al., "Migrate Empty Data Sets with Nonspecific Data Set Organizations", *IBM Technical Disclosure Bulletin*, vol. 27, No. 4A, Sep. 1984, pp. 2084–2085.

H.E. Kamionka, "Recalling Data in a Distributed Processing System", *IBM Technical Disclosure Bulletin*, vol. 26, No. 2, Jul. 1983, pp. 463–464.

*Primary Examiner*—Tod R. Swann
*Assistant Examiner*—Christopher S. Chow
*Attorney, Agent, or Firm*—Gray Cary Ware Freidenrich

[57] ABSTRACT

Non-disruptive data migration moves are performed form a source DASD to target DASD in a data subsystem. Both source and target DASDs comprise a cache and a nonvolatile store (NVS). Relative to the host, the target DASD generally operates as a source, managing requests for access to source DASD data by issuing I/O requests to the source DASD. First, the target DASD initiates a background data transfer, where data is copied from the source DASD to the target DASD preparing the target DASD to replace the source DASD. The data transfer includes copying data items directly from the source DASD's cache to that of the target DASD's cache, as well as copying data items from the source DASD's NVS to the target DASD's NVS. During background data transfer, the host can still perform data access operations, such as reads and writes, using the target DASD. Namely, for data already copied from the source DASD to the target DASD, the host reads this data from the target DASD. Host requests to read data not yet copied to the source DASD causes staging of the data from the source DASD to the target DASD. For host write requests, the data to be written to the target DASD, if no source data is needed to complete the write. To satisfy host write requests requiring data not yet copied from the source DASD, the data is copied from the source DASD to the target DASD.

70 Claims, 5 Drawing Sheets

TARGET DASD CONTROLLED DATA MIGRATION MOVE

BACKGROUND OF THE INVENTION

1. Field of the Invention

The present invention relates to migrating data from a source DASD to a target DASD. More particularly, the invention concerns a method, apparatus, and article of manufacture useful to migrate data from a source DASD to a target DASD as follows. The target DASD is coupled to the host instead of the source DASD, and the source DASD is coupled to the target DASD. The target DASD then manages the migration of data from the source DASD to the target DASD, the target DASD operating as a source DASD with respect to the host, and also operating as a host with respect to the source DASD.

2. Description of the Related Art

A common task in managing data processing systems is the moving or "migration" of data from one direct access storage device ("DASD") or set of DASDs to another. The DASD originally containing the data is the "source" DASD, and the DASD receiving the data is the "target" DASD. This need to relocate DASD data arises for a variety of reasons, such as the need to re-balance data placement, maintain equipment, move data to newer devices from older devices, etc. By substituting newer DASDs for older models, many different advantages may be realized, such as reduced "floor space", greater reliability, increased storage capacity, faster performance, and reduced power usage.

Data movement operations where "volumes" or other units of DASD data are transferred from one location to another may be called data "migration moves". Although the present methods for data migration moves may be adequate in certain cases, for other applications they may have certain drawbacks. Namely, some known methods disrupt applications being run on the data subsystem. During conventional migration moves, for example, host access to data may be interrupted while data from the source DASD is copied to the target DASD; sometimes this requires fifteen minutes or more per volume of data. Access to data by users (human operators and application programs alike) is also interrupted, since the users must be prevented from changing source data once the switchover has begun. This level of disruption may be excessive for some applications, such as automatic teller machines, which must constantly remain on-line. Other applications, although not disruptive in this sense, are limited due to compatibility problems; as a result, they can only conduct data migration in a small subset of potential hardware configurations.

Dual Copy

The Dual Copy function of the IBM 3990 storage controller provides one way to perform a migration move without halting system access to DASD data. With Dual Copy, both source and target volumes are attached to a single, common subsystem, i.e., the IBM 3990 controller, which performs the migration operation.

Using the IBM model 3990 Dual Copy, volume pairs are defined. Then, the controller copies data from one or more source (or "primary") volumes to one or more target (or "secondary") volumes, while providing host systems with read and write access to the source volumes. Once the initial copy has been completed, the IBM 3990 maintains the target volumes as current copies of the source volumes.

At a time scheduled by the system user, the application programs quiesce long enough for the copy pairs to be terminated via a system command. The source volumes are then logically disconnected from the system and the target volumes are connected, and the system is restarted with host access to the target volumes. This is a chief advantage of Dual Copy, since the data is only unavailable during the DASD connection/disconnection, which may be achieved by a quick re-configuration of interconnecting cables.

This use of the IBM 3990 Dual Copy is sometimes referred to as "Transient Dual Copy." Transient Dual Copy can significantly reduce the time that systems operations must be halted, sometimes to a few seconds. The process is limited, however, since the target volumes must be in a class of devices capable of physical attachment to the same IBM 3990 subsystem controller as the source volumes. More particularly, this limits the number of possible target DASDs (based on how many DASD controllers the IBM 3990 subsystem controller can handle), and also the types of target devices (based on the source DASD controller's compatibility with new DASD types).

For certain applications, another potential drawback of Transient Dual Copy is that its applicability is limited to moving data between DASDs of the same subsystem. Transient Dual Copy therefore lacks facilities to migrate data to new subsystems.

Peer-To-Peer Remote Copy ("PPRC")

One recently developed inter-subsystem copy function is PPRC, also called "Remote Copy" or "Remote Dual Copy". Although developed to provide real-time remote copy of DASD data for disaster protection, PPRC can also be used to perform Transient Dual Copy as described above. PPRC uses a pair of corresponding links (e.g. ESCON directors) to exchange data between first and second subsystems, each having one or more separate controllers and DASDs. Accordingly, PPRC facilitates copying between separate DASD subsystems, and also avoids some of the limitations of Transient Dual Copy, such as restrictions on the number and type of supported DASDs.

Although useful in many respects, some applications may find PPRC to be somewhat limited in terms of system configuration, since it requires the source controller to be among the newest subsystems. In particular, to perform PPRC the source controller must be at least an IBM model 3990 model 6 apparatus. In many applications this is impractical, since the reason for performing data migration in the first place is to migrate data from an older DASD, which is not compatible with the newer subsystem controllers.

Another potential limitation of PPRC is that the source and target DASDs must both have the same type of control unit. In cases where data is being migrated from an older model DASD subsystem to a newer model DASD subsystem, the control units will obviously differ.

Copy procedures, such as Remote Copy, are explained in detail in "Remote Copy Administrator's Guide and Reference", 2 Ed. (June 1995), Part No. SC35-0169-01, available through IBM Corporation. This entire document is incorporated herein by reference.

SUMMARY OF THE INVENTION

Broadly, the present invention concerns the migration of data from a "source" DASD to a "target" DASD. The migration is accomplished non-disruptively, where application programs continue to run without quiescing the source DASD or target DASD.

This is achieved by coupling the target DASD to the host, coupling the source DASD to the target DASD, and (optionally) detaching the source DASD from the host. Relative to the host, the target DASD then operates as a data source, where requests for access to source DASD data are managed and processed by the target DASD. Relative to the source DASD, the target DASD thus acts like a host, issuing I/O requests to the source DASD as needed.

Having established this configuration among the DASDs and host, data is copied from the source DASD to the target DASD in a background data transfer operation, preparing the target DASD to take the place of the source DASD. In newer subsystems such as the IBM 3990 (model 6) subsystems, for example, data may be copied using Remote Dual Copy ("RDC") or Peer-to-Peer Remote Copy ("PPRC").

Data copied from the source DASD to the target DASD may be specified by a user, such as a human operator, application program, and the like. Each data item to be copied may be identified in a copy map, such as a bit map that identifies each data item remaining to be copied by a predetermined bit setting or "flag". As each data item is successfully copied, the corresponding flag in the copy map is reset. Each data item may comprise a track of data, for example.

As "host data access" operations to the target and source DASDs are still permitted during background data transfer, the overall process is "non-disruptive." Host data access operations, for example, may involve reading data, writing data, seeking data, etc. For data already copied from the source DASD to the target DASD, host read requests are executed simply by reading the data from the target DASD. For data not yet copied from the source DASD to the target DASD, host read requests cause a "cache miss", resulting in staging of the data being from the source DASD to cache of the target DASD. For host format write requests, the data is simply written to the target DASD, as long as the write operations can be completed without any source data not yet copied to the target. To satisfy host write requests requiring data not yet copied from the source DASD, a "cache miss" is performed, whereby the data is copied from the source DASD to cache of the target DASD. Then, the write request is satisfied using the target DASD.

In one embodiment, the invention may be implemented to provide a method for DASD-to-DASD data migration in a data storage subsystem. In addition, a different aspect of the invention involves an apparatus embodied by a data storage subsystem programmed to perform DASD-to-DASD data migration in accordance with the invention. Still another version of the invention involves an article of manufacture such as a data storage medium tangibly embodying a program of machine-readable instructions executable by a digital processing apparatus to perform method steps for DASD-to-DASD data migration as discussed above.

The invention affords its users with a number of distinct advantages. Chiefly, unlike prior arrangements, the invention facilitates data transfer between source and target DASDs with different types of control units. This is possible because the migration move is supported by the target DASD controller—migration copy support is unnecessary in the source DASD controller. Accordingly, a newer DASD subsystem implementing the present invention can be a target for any appropriate format of older DASD, irrespective of controller type or attachment. Thus, the invention is well suited to the frequent need to move data from older DASDs and subsystems to newer equipment.

Another advantage is that the invention achieves the desired data migration from source DASD to target DASD without disrupting the host's data access. Additionally, by using an ESCON director, the required data subsystem interconnections can be achieved without cumbersome disconnection, connection, and routing of conventional cables. The present invention also provides other advantages and benefits, as apparent from the description provided below.

BRIEF DESCRIPTION OF THE DRAWINGS

The nature, objects, and advantages of the invention will become more apparent to those skilled in the art after considering the following detailed description in connection with the accompanying drawings, in which like reference numerals designate like parts throughout, wherein.

DETAILED DESCRIPTION OF THE PREFERRED EBODIMENTS

As mentioned above, the present invention facilitates data migration moves between a source DASD and a target DASD in a data subsystem. Advantageously, this is achieved with minimal disruption of ongoing host data access operations, despite apparent incompatibility between source DASD and target DASD controllers.

Hardware Components & Interconnections

Figure 1:
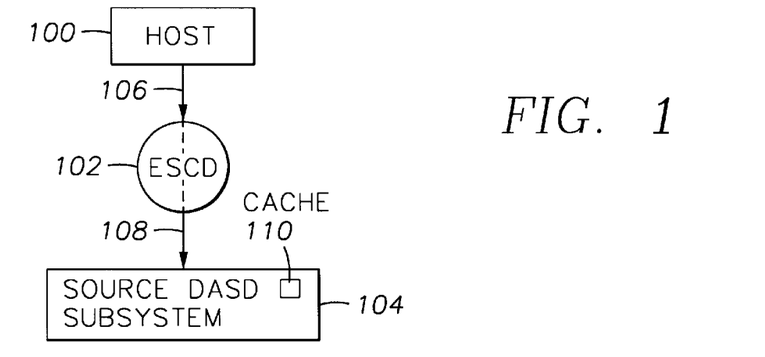
FIG. 1 is a hardware diagram of a data storage subsystem prior to conducting data migration in accordance with the invention.
Figure 2:
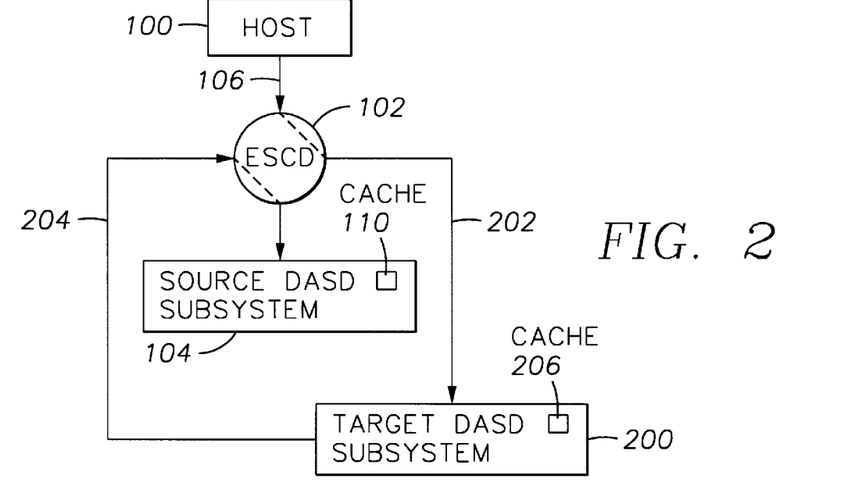
FIG. 2 is a hardware diagram of a data storage subsystem while conducting data migration in accordance with the invention.
Figure 3:
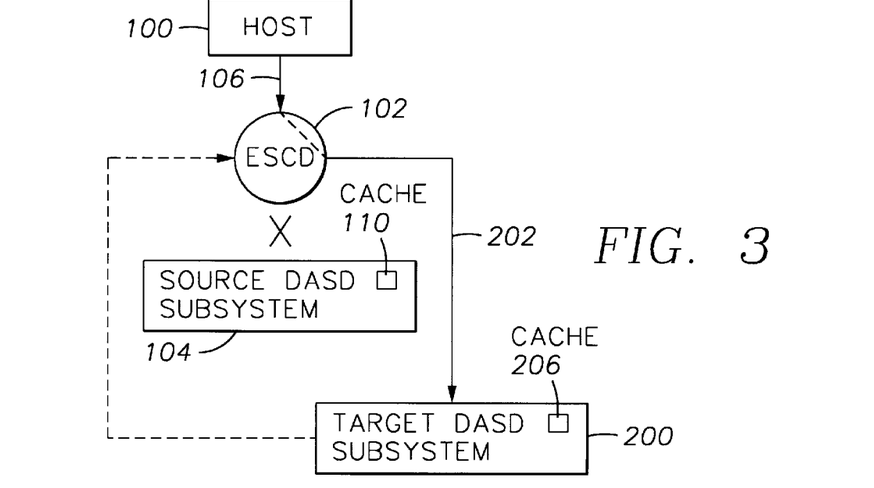
FIG. 3 is a hardware diagram of a data storage subsystem after conducting data migration in accordance with the invention.

One aspect of the invention concerns a data storage subsystem, which may be embodied by various hardware components and interconnections as shown in FIGS. 1–3.

FIG. 1 depicts a data storage subsystem prior to conducting data migration according to the invention. The subsystem includes a host 100 ("host"), which may comprise one or multiple host systems. In an exemplary embodiment, the host 100 may comprise an IBM model ES/9000 mainframe computer having an ESA/390 channel for data I/O. The host 100 is interconnected to a DASD subsystem 104 via an interface 102. The host and programmable interface 102 may be coupled by a communication link 106 such as a fiber optic channel, conductive wire, radio link, etc. The interface 102 and DASD subsystem 104 may be coupled by a communications link 108, such as a fiber optic channel, conductive wire, radio link, etc.

Preferably, as illustrated, the interface 102 comprises a programmable interface such as an IBM Enterprise Systems Connection ("ESCON") I/O interface. The ESCON I/O interface, as known in the art, is a type of channel path that allows attachment of one or more control units to an ESA/390 channel subsystem by using optical fiber links. The ESCON I/O interface provides protocols required for information transfer over that channel path. Additional information about the structure and operation of the ESCON I/O interface is available in the following publications, each of which is incorporated herein by reference in its entirety: (1) "Enterprise Systems Architecture/390: ESCON I/O Interface", P/N SA22-7202-02, 3 Ed. (August 1992), published by IBM Corporation, and (2) "Introducing the Enterprise Systems Connection Manager", P/N GC23-0422-01, 2 Ed. (October 1991), published by IBM Corporation.

Although the programmable interface 102 is used in a preferred embodiment, the invention also contemplates other configurations, such as a non-programmable interface (not shown) such as a SCSI, or arrangements where DASDs may be coupled directly to the host 100.

Since the invention operates to transfer data from the DASD subsystem 104 to another DASD subsystem, the invention may be especially useful to transfer data from an old DASD subsystem to a newer model. Therefore, in many cases the DASD subsystem 104 may comprise an older model DASD subsystem, such as IBM models 3380 and 3390. However, the DASD subsystem 104 may comprise new, state of the art DASD models as well, such as the IBM RAMAC product. Furthermore, although referred to in the singular, the DASD subsystem 104 may comprise multiple DASD storage devices.

Since the invention seeks to transfer data originally stored on the DASD subsystem 104 elsewhere, the DASD subsystem 104 may also be referred to as the "old DASD", the "source DASD", or the "primary DASD". The source DASD 104 includes nonvolatile storage ("NVS"), such as magnetic disk storage, optical disk storage, or another appropriate type of direct access storage. Although not required, the source DASD 104 may also include a cache 110 ("source cache") of fast-access memory such as RAM.

FIG. 2 depicts a data storage subsystem during a data migration move according to the invention. As discussed in greater detail below, during data migration the host 100 is coupled to a DASD subsystem 200 instead of the source DASD 104. Since the invention seeks to transfer data from the source DASD 104 to the DASD subsystem 200, the DASD subsystem 200 may also be referred to as the "target DASD", the "secondary DASD", or the "new DASD".

During data migration, the source DASD 104 is coupled to the target DASD 200. The target DASD 200 manages data transfer to itself from the source DASD 104 as part of a "background data transfer operation", described in greater detail below. The target DASD 200 facilitates host data access by managing data retrieval from the source DASD 104 in response to requests from the host 100. The target DASD 200 is coupled to the interface 102 by communications links 202, 204, such as fiber optic channels, conductive wires, radio links, etc. Although the links 202, 204 are similarly constructed, one link 202 serves to connect the target DASD 200 to the host 100, whereas the other link 204 connects the target DASD 200 with the source DASD 104.

The invention may be especially useful to transfer data from an old DASD subsystem to a newer model, as mentioned above. Therefore, in many cases the target DASD 200 may comprise a newer model DASD subsystem, such as the IBM RAMAC product. However, the target DASD 200 may comprise an older DASD model, as well, such as the IBM 3380, 3390, etc. The target DASD 200, although referred to in the singular, may comprise multiple DASDs if desired. Like the source DASD 104, the target DASD 200 includes NVS (not shown), and may also include a cache 206 ("target cache") of fast-access memory such as RAM.

FIG. 3 depicts a data storage subsystem after a data migration move according to the invention. At this point, data from the source DASD 104 has been transferred to the target DASD 200. Data access requests may be satisfied by the target DASD 200 without assistance from the source DASD 104. Therefore, the source DASD 104 may be decoupled from the target DASD 200. Detachment of the source DASD 104 from the target DASD 200 may be achieved by software-based reconfiguration of the interface 102, or by mechanically removing the link 204. Mechanical removal of the link 204 has the advantage of permitting complete removal of the source DASD 104 from the other components, which may be desired, especially if the source DASD 104 is an older device to be recycled, discarded, or otherwise retired.

Operation

Operational Considerations

In addition to the various hardware embodiments described above, a different aspect of the invention concerns a method for performing a data migration move in a data storage subsystem. Such a method may be implemented, for example, by operating equipment such as the target DASD 200 to execute a sequence of machine-readable instructions. In an illustrative embodiment of the invention, the machine-readable instructions may comprise lines of "C" and assembly language code. These instructions reside in various types of data storage media. In this respect, one aspect of the present invention concerns an article of manufacture, comprising a data storage medium tangibly embodying a program of machine-readable instructions executable by a digital data processor to perform method steps to perform data migration from a source DASD to a target DASD.

Figure 4:
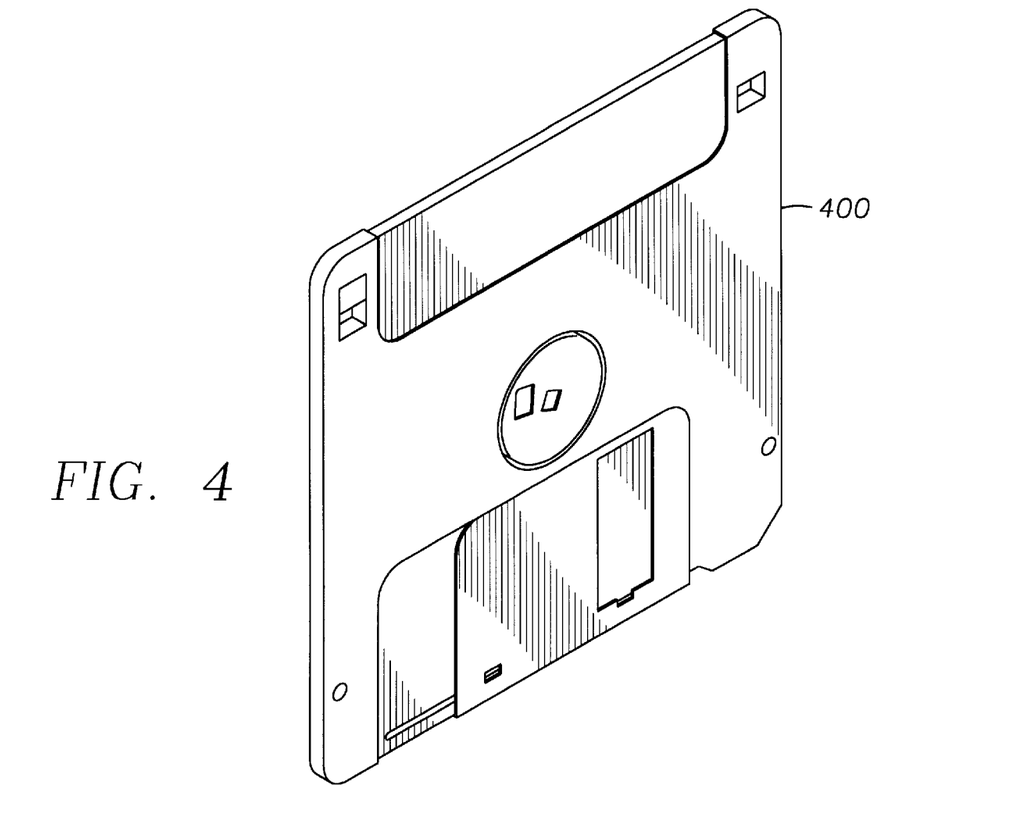
FIG. 4 is an article of manufacture embodied by a data storage medium in accordance with the invention.

Such a data storage medium may comprise, for example, RAM and/or DASD storage (not shown) of the target DASD 200. Alternatively, the instructions may be contained in another data storage medium, such as a magnetic data storage diskette 400 (FIG. 4). Whether contained in the target DASD 200 or elsewhere, the instructions may instead be stored on a different type of data storage medium such as DASD storage (e.g. a conventional "hard drive" or a RAID array), magnetic tape, electronic read-only memory (e.g. ROM), optical storage device (e.g. WORM), paper "punch" cards, or other data storage media.

Sequence of Operation

Figure 5:
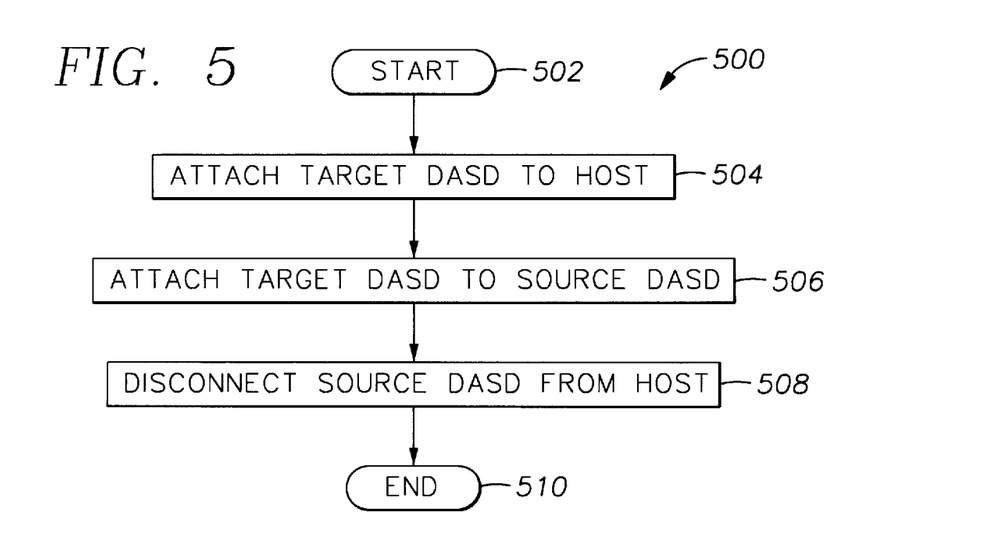
FIG. 5 is a flowchart illustrating method steps for configuring a data storage subsystem to perform data migration moves according to one exemplary embodiment of the invention.
Figure 6A:
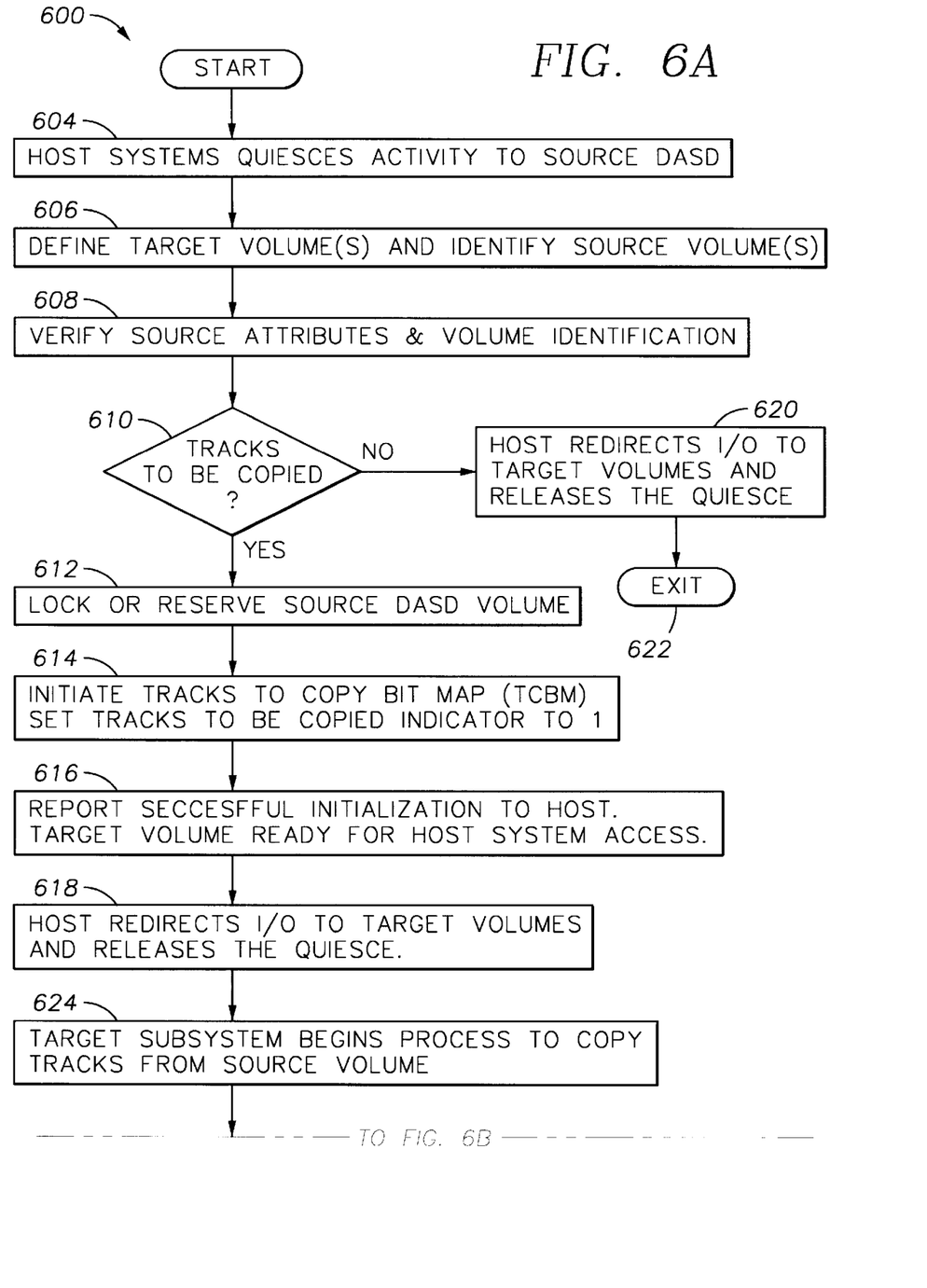
FIGS. 6A–6B provide flowcharts illustrating method steps for background data transfer operations during a data migration, according to one exemplary embodiment of the invention.
Figure 6B:
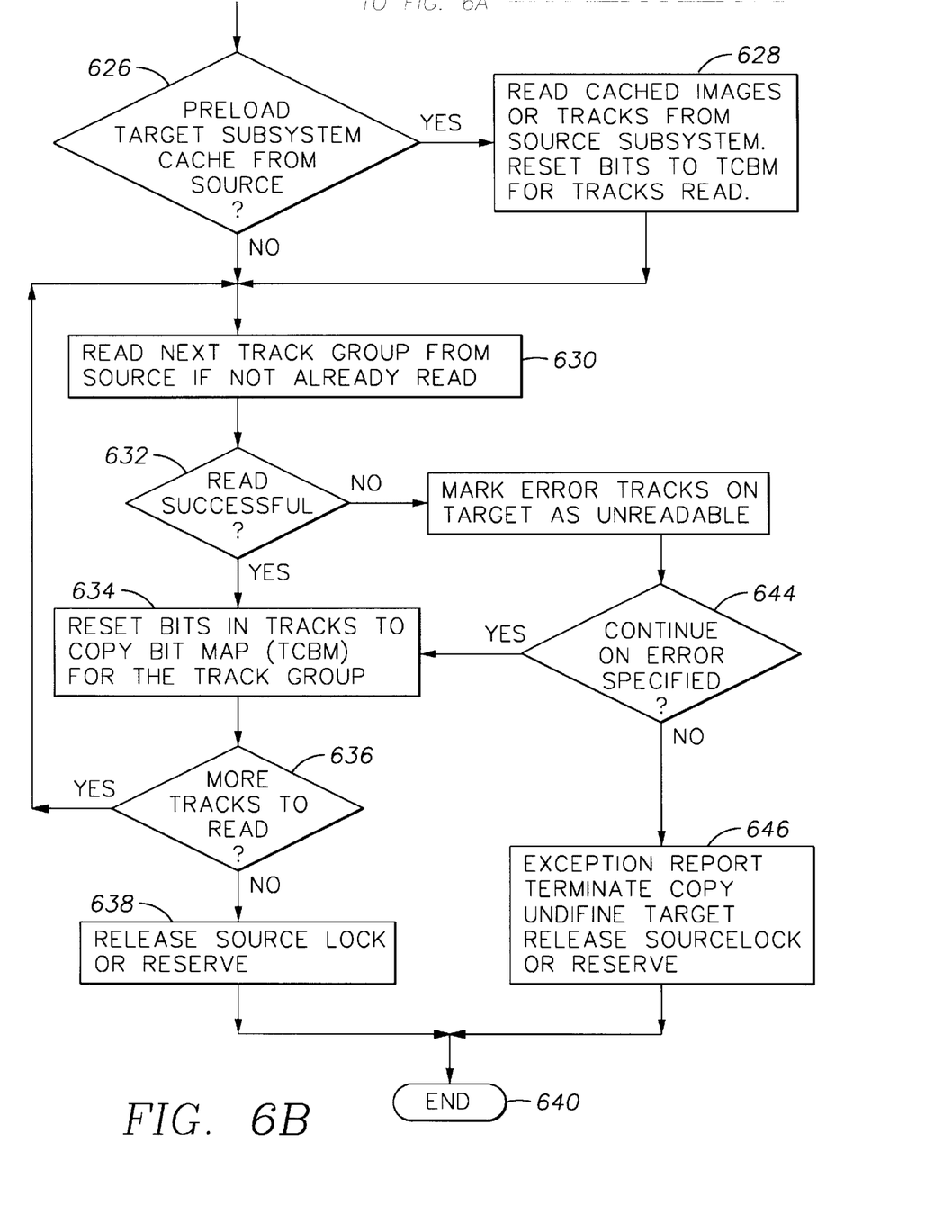
Figure 7:
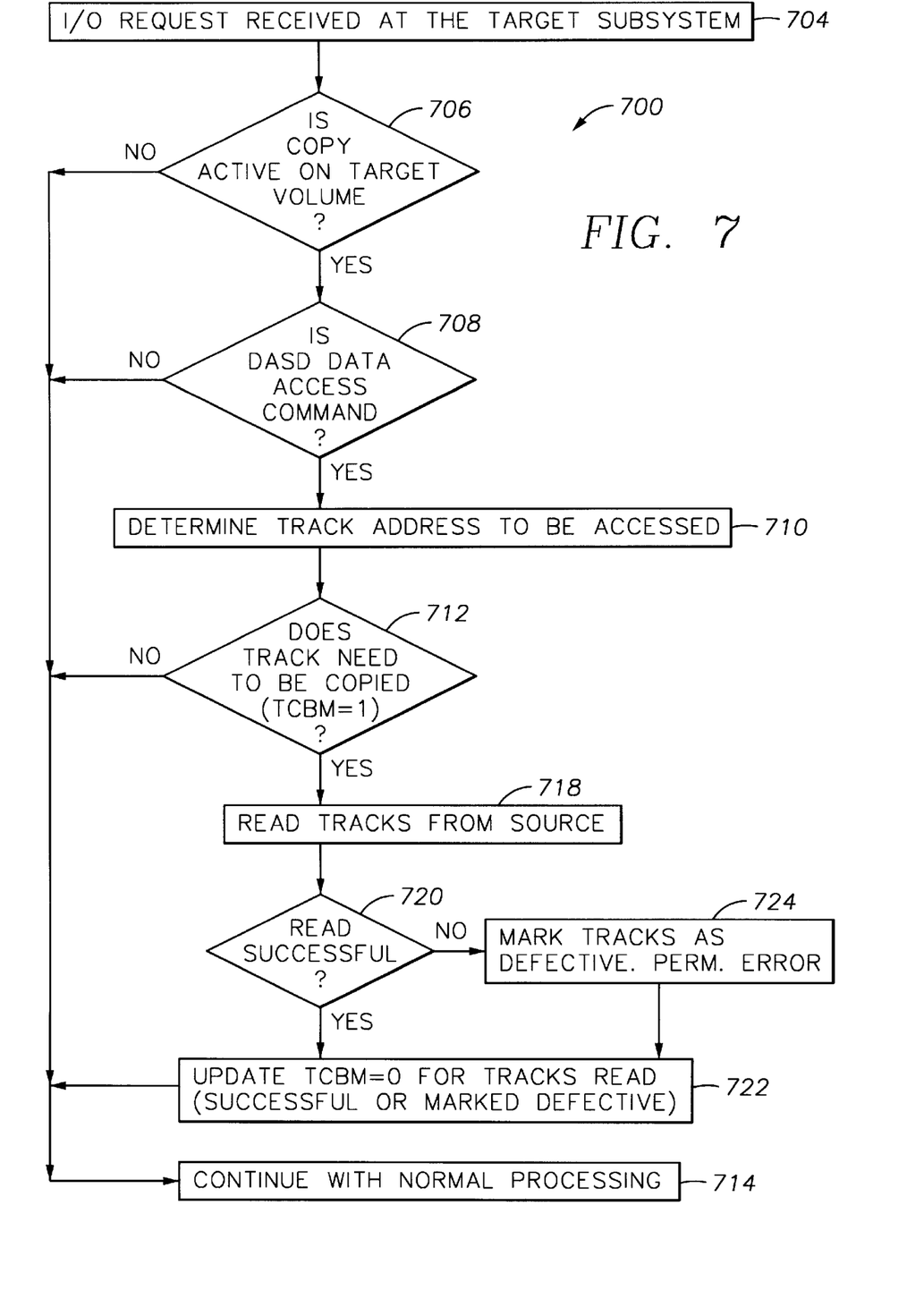
FIG. 7 is a flowchart illustrating method steps for host data access during a data migration move according to one exemplary embodiment of the invention.

FIGS. 5–7 show sequences of method steps 500, 600, 700 to illustrate different aspects of one illustrative method of the present invention. FIG. 5 depicts the steps 500 involved in configuring the data subsystem to perform a data migration move according to the invention. FIGS. 6A–6B show the steps 600 of a background data transfer operation, conducted during data migration according to the invention. FIG. 7 shows steps 700 involved in host data access operations, also conducted during data migration according to the invention.

For ease of explanation, but without any limitation intended thereby, the examples of FIGS. 5–7 are described in the context of the hardware components and interconnections described in FIGS. 1–3

A. Configuring the Data Storage Subsystem

Referring to FIG. 5, the steps 500 serve to reconfigure the data subsystem components from the arrangement of FIG. 1 to that of FIG. 2. In the illustrated embodiment, these steps involve a combination of manual electrical connections and some software programming of the interface 102. These details are described in greater detail below.

After the sequence 500 begins in task 502, the target DASD 200 is attached to the host 100 in task 504. In the illustrated example (FIG. 2), this is achieved by physically coupling the target DASD 200 to one of the ports (not shown) of the programmable interface 102, and then programming the interface 102 to connect the target DASD 200 to the host 100. Alternatively, this step may be performed by physically coupling the target DASD 200 directly to the host 100, avoiding the use of the interface 102 entirely.

At this point, the target DASD 200 is preferably empty of data, its storage facilities ready to receive the contents of the source DASD 104. Next, in task 506 the target DASD 200 is attached to the source DASD 104. In the illustrated example, this may be easily achieved by appropriate re-programming of the programmable interface 102, since the source and target DASDs are already coupled to the interface 102. In an alternative embodiment, the target DASD 200 may physically coupled to the source DASD 104 without use of the interface 102. Alternatively, the order of tasks 506 and 504 may be reversed. After all desired data has been copied from the source DASD 104 to the target DASD 200, the source DASD 104 may be (optionally) disconnected from the host 100 in task 508. In the illustrated example (FIG. 2), this may be achieved by appropriately re-programming the programmable interface 102. Alternatively, the source DASD 104 may be physically disconnected from the host 100. If desired, task 508 may also involve physically removing the source DASD 104 from the subsystem. Task 508 is optional, however, since the subsystem may continue to operate with the source DASD 104 linked to the host if desired.

Finally, after task 508, the routine 500 ends in task 510. Now, the components 100, 102, 104, and 200 are ready to perform data migration in accordance with the invention.

B. Background Data Transfer Operations

Referring to FIGS. 6A–6B, the steps 600 serve to manage the ongoing transfer of data from the source DASD 104 to the target DASD 200. These steps are preferably performed by the target DASD 200, preferably by executing machine-readable instructions stored by the target DASD 200, as discussed above.

After the sequence 600 begins in task 602, the host 100 in task 604 completely quiesces activity of the source DASD 104. This ensures that, for the next several operations, neither the host 100 nor any other system can access the source DASD 104.

Next, task 606 performs various initializing operations, including: (1) identifying the source DASD 104, (2) defining the target DASD 200, and (3) defining a path from the source DASD 104 to the target DASD 200. These tasks may be accomplished, for example, by the system administrator issuing appropriate channel commands.

Task 606 also defines the data items to be copied, forming a copy master list. Each data item may comprise a track or a partial track of data, or another convenient parcel of data. For ease of explanation, without any limitation intended thereby, the invention is described herein as using data items corresponding to tracks or partial tracks of data. The copy master list may include all tracks in the source DASD 104, or only selected tracks, depending upon the application. For instance, the copy master list may define a subset of all volume tracks to permit data set ("extent") moves from source DASD to target DASD. As another example, even when an entire volume is to be copied, efficiency can be gained by copying only those tracks that have been actually "allocated" in the source DASD 104 for the storage of data. Moreover, efficiency may be realized by adjusting the copy master list to omit tracks that are completely or partially empty, despite being allocated.

The copy master list may originate from a number of different sources. In one example, the copy master list may be created by the system administrator upon issuing a list of "extents" (e.g., track addresses). Alternatively, the target DASD 200 may create the copy master list when the target DASD 200 obtains and uses the file system space allocation objects stored in the source DASD 104. For example, in an IBM system, if the target DASD 200 has MVS file system knowledge it may read and interpret the contents of the volume space directory (e.g., VTOC) to initialize the copy operation for only allocated extents. Unoccupied tracks therefore remain un-initialized on the target DASD 200, returning invalid format errors if accessed, similar to un-initialized tracks in a virtual DASD.

Following task 606, the target DASD 200 in task 608 verifies that the source attributes and volume identification have been correctly made. Task 606 may involve, for example, the target DASD 200 verifying that it recognizes the source DASD 104 as defined.

Query 610 then asks whether there are any tracks to be copied from the source DASD 104 to the target DASD 200. Preferably, this is performed by reviewing the copy master list. If there are no tracks to be copied, the host 100 in task 620 redirects I/O to the target DASD 200 and releases the quiesce state previously placed on the source DASD 104 in task 604. Releasing the source DASD's quiesce enables the host and other systems to now access the source DASD 104. After task 620, the sequence 600 ends in task 622.

On the other hand, if query 610 determines that there are tracks to be copied from the source DASD 104, the sequence 600 proceeds to task 612. In task 612, the target DASD 200 configures the source DASD 104 to only accept data access I/O requests from the target DASD 200. For example, the target DASD 200 may issue a "reserve" or "lock" command to the source DASD 104. Added protection may be accomplished by employing "write protection" or "write inhibit" features of the source DASD 104, if available.

After task 612, the target DASD 200 initializes a copy progress map (not shown) in task 614. The copy progress map contains an indicator for each data item in the copy master list. The indicator denotes whether or not the corresponding data item has been copied to the target DASD 200. In the preferred embodiment (as illustrated), the copy progress map comprises a tracks-to-copy bit map ("TCBM"), containing a single digital bit or "flag" for each track-to-be-copied named in the copy master list. The flags are "set" (i.e., made equal to one) when they remain to be copied; similarly, the flags are "cleared" (i.e., made equal to zero) after they have been copied. Thus, in the illustrated embodiment the target DASD 200 in task 614 creates the TCBM, where all tracks from the copy master list are individually associated with binary ones, "flagging" these tracks for eventual copying to the target DASD 200. Table 1 shows an exemplary copy progress map, where each indicator comprises a binary bit, and all bits have been preset to "one".

TABLE 1

| TCBM | |
|---|---|
| track ID | flag |
| track 1 | 1 |
| track 2 | 1 |
| track 3 | 1 |
| track 4 | 1 |
| . | . |
| . | . |
| . | . |
| track N | 1 |

After task 614, the target DASD 200 reports successful initialization to the host 100 in task 616. This indicates that the target DASD 200 is now ready for access by the host. Accordingly, in task 618 the host 100 redirects all I/O requests to the target DASD 200 (instead of the source DASD 104) and releases the quiesce placed upon the source DASD 104. Releasing the source DASD's quiesce enables the host and other systems to now access the source DASD 104. However, writing over data stored in the source DASD 104 is still prevented in accordance with the "reserve" or "lock" command issued in task 612, as described above. Data stored on the source DASD 104 must remain undisturbed to preserve the integrity of data to be copied to the target DASD 200.

After task 618, task 624 begins the process of copying tracks from the source DASD 104 to the target DASD 200 in accordance with the copy master list. First, query 626 determines whether it is appropriate to copy contents of the source cache 110 to the target cache 206. To do this, the target DASD 200 queries the source DASD 104 to determine whether a source cache exits, and if so, whether it is capable of providing a cache directory listing its contents (e.g., which tracks are stored therein). If these conditions are met, it is advantageous to preload the source cache 110 to the target cache 206.

In this case, task 628 then "preloads" the cached tracks by reading them from the source cache 110 directly into the target cache 206. In the case of partially cached tracks, task 628 may copy the cached portion of the track from the source cache 110 and copy the remaining portion of the track from NVS of the source DASD 104. With this procedure, the target DASD 200 quickly configures its cache residence to replicate the source cache 110, thereby helping to expedite the background data transfer operation.

After task 628 (or alternatively, a negative answer to query 626), task 630 proceeds according to the TCBM, reading the next track from the source DASD 104. Task 630 may read individual tracks from the source DASD 104, or groups of tracks when possible to save time. If query 632 finds that this read is successful, task 634 zeroes the appropriate TCBM bits corresponding to the copied track group. Then, query 636 asks whether there are any more tracks to be read. If so, control returns to task 630, which executes as discussed above. Otherwise, task 638 releases the "lock" or "reserve" previously placed on the source DASD 104, making the DASD 104 available again for data access operations. After task 638, the process 600 ends in task 640.

In contrast to the preceding description, if query 632 finds that the read attempted in task 630 is unsuccessful, task 642 creates a record marking these tracks as being unreadable. This may be achieved by creating a list, bit map, or other appropriate summary on the target DASD 200 or another suitable location. Then, query 644 asks whether the process 600 was initially set up to continue on an error condition, or to abort. If "continue on error" was specified, the process 600 resumes at task 634, where the TCBM is modified to list the last track(s) as having been copied, despite the error. If continue on error is not permitted, however, task 646 prepares an exception report and terminates the copy operation. The exception report lists various statistics associated with the error and how it arose. Task 646 also un-defines the target DASD 200 and releases the "lock" or "reserve" on the source DASD 104. After task 646, the sequence 600 ends in task 640.

C. Host Data Access

Referring to FIG. 7, the steps 700 serve to manage data access by the host 100 to data of the source and target DASDs 104, 200. These steps are executed by the target DASD 200, preferably by executing machine-readable instructions stored by the target DASD 200, as discussed above.

Advantageously, the sequence 700 is preferably conducted simultaneously with the background data transfer operation 600. Thus, as the background data transfer operation methodically copies data from the source DASD 104 to the target DASD 200, the host data access sequence 700 may be called upon to access the target DASD 200 to satisfy data access requests of the host 100. When the host 100 requests access to data not contained in the target DASD 200, the target DASD 200 responsively obtains the data from the source DASD 104 to satisfy the host's data access request. Thus, the sequence 600 operates in the "background", subject to the host's data access requests, which the target DASD 200 satisfies as they are received.

As explained in greater detail below, the sequence 700 begins when the target DASD 200 receives an I/O request from the host 100 in task 704. The I/O request may include operations such as Read, Write, Seek, and other known I/O operations, including but not limited to data access operations. Then, query 706 asks whether the requested data is "active" on the target DASD 200. In other words, this query asks whether the requested data is present on the copy master list. If not, query 706 forwards control to task 714, wherein the I/O request is processed pursuant to "normal" procedures (e.g., satisfying the I/O request with data wholly contained on the target DASD 200 or another data storage device accessible by the host 100).

On the other hand, if query 706 determines that the requested data is on the copy master list, query 708 asks whether the I/O request is a data access command. If not, query 708 forwards control to task 714, which proceeds with normal processing of the I/O request. If the I/O request is a data access command, however, the target DASD 200 in task 710 examines the I/O request to identify the address of the track(s) that must be accessed. If the host I/O request is a Read request, certain track(s) must be present in the target DASD 200 to satisfy the read request there. Similarly, if the host I/O request is a Write request, the presence of certain track(s) may be needed in the target DASD 200 to fully complete the Write request there. Next, the target DASD 200 consults the copy master list in query 712 to determine whether the background data transfer process has copied the identified track(s) from the source DASD 104 to the target DASD 200. If so, query 712 forwards control to task 714, which proceeds with normal processing of the I/O request.

However, if the requested track still remains to be copied, the target DASD 200 in task 718 reads the track(s) from the source DASD 104 in task 718. These Read Operations are treated by the target DASD 200 as "cache misses," such that the target DASD 200 first (task 718) reads the requested tracks from the source DASD 104 into the target cache 206, then (later, in task 714) satisfies the host request from the data recently copied into cache.

After task 718, the target DASD 200 performs query 720, which determines whether the read operation of task 718 was successful. If not, the target DASD 200 in task 724 creates a record indicating that the track(s) attempted to be read are defective. Following task 724, the target DASD 200 in task 722 updates the TCBM to reflect that the latest track(s) have been read, albeit unsuccessfully. Following task 722, task 714 continues with normal processing.

If query 720 determines that the read was successful, however, control is directly routed to task 722 and 714, since the error record of task 724 is unnecessary.

Other Embodiments

While there have been shown what are presently considered to be preferred embodiments of the invention, it will be apparent to those skilled in the art that various changes and modifications can be made herein without departing from the scope of the invention as defined by the appended claims.

For example, copying data from the source DASD 104 to the target DASD 200 may be performed to include several efficiency inducing measures. For instance, copying may proceed in track address sequence or any other sequence that might optimize performance of host accesses to the target. Tracks may be copied out of sequence if they are needed from the source to satisfy a host access. Staging from a source subsystem and volume can occur under control of staging optimization routines, such as known physical DASD staging operations. For instance, if a host request indicates sequential access, the target DASD 200 may immediately stage ahead some address groups in sequence beyond what is staged (i.e., copied) to satisfy the host I/O request. In this embodiment, bits for track addresses copied are preferably set to zero after each track has been successfully copied, irrespective of the sequence copied.

What is claimed is:

1. A method for migrating data to a target DASD from a source DASD coupled to a host, the source DASD including a source cache and a source non-volatile storage ("NVS"), the target DASD including a target cache and target NVS, said method comprising:

electrically coupling the target DASD to the host;
   electrically coupling the source DASD to the target DASD;
   directing requests for access of data contained on the source DASD to the target DASD;
   copying data stored in the source DASD to the target DASD by:
      copying items of data stored in the source cache to the target cache; and separately
      copying items of data stored in the source NVS to the target NVS;
   concurrently with the copying steps, operating the target DASD to receive from the host requests for access to data stored in the source DASD, and in response to said receipt to satisfy the data access requests by performing steps comprising:
      in response to a host read request for data, providing the requested data to the host from the target DASD if the requested data has already been copied from the source DASD, otherwise copying the requested data from the source DASD to the target DASD and then providing the requested data to the host from the target DASD; and
      in response to a host request to write data, writing the requested data from the host to the target DASD if completion of the write request does not require data present in the source DASD but not present in the target DASD, otherwise copying the required data from the source DASD to the target DASD and then writing the requested data from the host to the target DASD.

2. The method of claim 1, further comprising the step of, concurrently with the copying steps, maintaining a copy progress map distinguishing items of data that have been copied from the source DASD to the target DASD from other items of data.

3. The method of claim 2, each item of data comprising a track of data stored on the source DASD.

4. The method of claim 2, the copy progress map comprising a bit map where each bit is associated with a different item of data in the source DASD, the maintaining step comprising the steps of setting each bit of the copy progress map to a predetermined value upon copying the associated data item to the target DASD.

5. The method of claim 4, the predetermined value being a binary zero.

6. The method of claim 4, the predetermined value being a binary one.

7. The method of claim 1, further including the steps of electrically decoupling the source DASD from the host.

8. The method of claim 1, the step of copying items of data stored in the source NVS comprising:

copying a number of items of data stored in the source NVS to the target cache, and copying a number of items of data stored in the source NVS to the target NVS.

9. The method of claim 1, the source DASD including a source cache and a source non-volatile storage ("NVS"), the target DASD including a target cache and target NVS, the steps performed in response to a host read request for data comprising the steps of:

providing the requested data to the host from the target DASD if the requested data has already been copied from the source DASD, otherwise copying the requested data from the source DASD to the target cache and then providing the requested data to the host from the target cache.

10. The method of claim 1, the source DASD including a source cache and a source non-volatile storage ("NVS"), the target DASD including a target cache and target NVS, the steps performed in response to a host request to write data comprising the steps of:

writing the requested data from the host to the target cache if completion of the write request does not require data present in the source DASD but not present in the target DASD, otherwise copying the required data from the source DASD to the target cache and then writing the requested data from the host to the target cache.

11. The method of claim 1, the target DASD and source DASD being electrically coupled to a programmable interface that is electrically coupled to the host, the steps of electrically coupling the target DASD to the host and electrically coupling the source DASD to the target DASD comprising the steps of:

re-programming the programmable interface to electrically couple the target DASD to the host; and
    re-programming the programmable interface to electrically couple the source DASD to the target DASD.

12. The method of claim 11, the programmable interface comprising an ESCON director.

13. The method of claim 1, the steps of electrically coupling the target DASD to the host and electrically coupling the source DASD to the target DASD comprising the steps of:

placing a first communications link between the target DASD and the host; and placing a second communications link between the source DASD and the target DASD.

14. The method of claim 13, further comprising the steps of:

removing any communications link between the source DASD and the host.

15. The method of claim 13, at least one of the first and second communications links comprising a fiber optic link.

16. The method of claim 13, at least one of the first and second communications links comprising a cable having an electrically conductive member.

17. The method of claim 1, the host comprising multiple digital processing apparatuses.

18. The method of claim 1, the host comprising a single digital processing apparatus.

19. The method of claim 1, the source DASD including multiple DASDs.

20. The method of claim 1, the target DASD including multiple DASDs.

21. A method for migrating data to a target DASD from a source DASD, the target DASD being coupled to the host and the source DASD being coupled to the target DASD, the source DASD including a source cache and a source non-volatile storage ("NVS") the target DASD including a target cache and target NVS, said method comprising:

directing requests for access of data contained on the source DASD to the target DASD;

copying data stored in the source DASD to the target DASD by:

copying items of data stored in the source cache to the target cache; and separately copying items of data stored in the source NVS to the target NVS;

concurrently with the copying steps, operating the target DASD to receive from the host data access requests and in response to said receipt to satisfy the data access requests by performing steps comprising:

in response to a host read request for data, providing the requested data to the host from the target DASD if the requested data has already been copied from the source DASD, otherwise copying the requested data from the source DASD to the target DASD and then providing the requested data to the host from the target DASD; and in response to a host request to write data, writing the requested data from the host to the target DASD if completion of the write request does not require data present in the source DASD but not present in the target DASD, otherwise copying the required data from the source DASD to the target DASD and then writing the requested data from the host to the target DASD.

22. The method of claim 21, further comprising the step of, concurrently with the copying steps, maintaining a copy progress map distinguishing items of data that have been copied from the source DASD to the target DASD from other items of data.

23. The method of claim 22, each item of data comprising a track of data stored on the source DASD.

24. The method of claim 22, the copy progress map comprising a bit map where each bit is associated with a different item of data in the source DASD, the maintaining step comprising the steps of setting each bit of the copy progress map to a predetermined value upon copying the associated data item to the target DASD.

25. The method of claim 24, the predetermined value being a binary zero.

26. The method of claim 24, the predetermined value being a binary one.

27. The method of claim 21, further including the steps of electrically decoupling the source DASD from the host.

28. The method of claim 21, the step of copying items of data stored in the source NVS comprising:

copying a number of items of data stored in the source NVS to the target cache, and copying a number of items of data stored in the source NVS to the target NVS.

29. The method of claim 21, the source DASD including a source cache and a source non-volatile storage ("NVS"), the target DASD including a target cache and target NVS, the steps performed in response to a host read request for data comprising the steps of:

providing the requested data to the host from the target DASD if the requested data has already been copied from the source DASD, otherwise copying the requested data from the source DASD to the target cache and then providing the requested data to the host from the target cache.

30. The method of claim 21, the source DASD including a source cache and a source non-volatile storage ("NVS"), the target DASD including a target cache and target NVS, the steps performed in response to a host request to write data comprising the steps of:

writing the requested data from the host to the target cache if completion of the write request does not require data present in the source DASD but not present in the target DASD, otherwise copying the required data from the source DASD to the target cache and then writing the requested data from the host to the target cache.

31. The method of claim 21, the host comprising multiple digital processing apparatuses.

32. The method of claim 21, the host comprising a single digital processing apparatus.

33. The method of claim 21, the source DASD including multiple DASDs.

34. The method of claim 21, the target DASD including multiple DASDs.

35. A method for migrating data to a target DASD from a source DASD coupled to a host, the source DASD including a source cache and a source non-volatile storage ("NVS"), the target DASD including a target cache and target NVS, said method comprising:

electrically coupling the target DASD to the host;

electrically coupling the source DASD to the target DASD;

electrically decoupling the source DASD from the host;

copying data stored by the source DASD to the target DASD by performing steps comprising:

receiving an identification of data items contained on the source DASD to be copied to the target DASD;

creating a copy progress map including a listing of each identified data item, the copy progress map including for each data item an indicator denoting whether that data item has been copied from the source DASD to the target DASD;

redirecting requests for access of data contained on the source DASD to the target DASD;

operating the target DASD to repeatedly perform the following steps until all data items have been copied to the target DASD;

selecting a data item whose indicator denotes that said data item has not been copied from the source DASD to the target DASD; reading the selected data item from the source DASD;

copying the selected data item to the target DASD by copying data stored in the source cache to the target cache and separately copying data stored in the source NVS to the target NVS;

changing the indicator of the data item to denote that said data item has been copied from the source DASD to the target DASD; satisfying any host data access requests received during the operating step by performing steps comprising:

in response to a host request to read a data item, providing the data item to the host from the target DASD if the data item has already been copied from the source DASD, otherwise, copying the data item from the source DASD to the target DASD, providing the data item to the host from the target cache, and changing indicators corresponding to the copied data item to denote that said data item has been copied from the source DASD to the target DASD; and in response to a host request to write a data item from the host to the target DASD, writing the data item to the target DASD if completion of the write request does not require any data items present in the source DASD but not present in the target DASD, otherwise copying the required data items from the source DASD to the target DASD and then writing data from the host to the target DASD and changing indicators corresponding to the copied data items to denote that said data items have been copied from the source DASD to the target DASD.

36. An article of manufacture comprising a data storage medium tangibly embodying a program of machine-readable instructions executable by a digital processing apparatus to perform method steps for migrating data from a source DASD to a target DASD, the source DASD including a source cache and a source non-volatile storage ("NVS"), the target DASD including a target cache and target NVS, said method steps comprising:

directing requests for access of data contained on the source DASD to the target DASD;

copying data stored in the source DASD to the target DASD by:
  copying items of data stored in the source cache to the target cache; and separately
  copying items of data stored in the source NVS to the target NVS;

concurrently with the copying steps, operating the target DASD to receive from the host data access requests and in response to said receipt to satisfy the data access requests by performing steps comprising:

in response to a host read request for data, providing the requested data to the host from the target DASD if the requested data has already been copied from the source DASD, otherwise copying the requested data from the source DASD to the target DASD and then providing the requested data to the host from the target DASD; and in response to a host request to write data, writing the requested data from the host to the target DASD if completion of the write request does not require data present in the source DASD but not yet present in the target DASD, otherwise copying the required data from the source DASD to the target DASD and then writing the requested data from the host to the target DASD.

37. The article of claim 36, further comprising the step of, concurrently with the copying steps, maintaining a copy progress map distinguishing items of data that have been copied from the source DASD to the target DASD from other items of data.

38. The article of claim 37, each item of data comprising a track of data stored on the source DASD.

39. The article of claim 37, the copy progress map comprising a bit map where each bit is associated with a different item of data in the source DASD, the maintaining step comprising the steps of setting each bit of the copy progress map to a predetermined value upon copying the associated data item to the target DASD.

40. The article of claim 39, the predetermined value being a binary zero.

41. The article of claim 39, the predetermined value being a binary one.

42. The article of claim 36, further including the steps of electrically decoupling the source DASD from the host.

43. The article of claim 36, the step of copying items of data stored in the source NVS comprising
  copying a number of items of data stored in the source NVS to the target cache, and copying a number of items of data stored in the source NVS to the target NVS.

44. The article of claim 36, the source DASD including a source cache and a source non-volatile storage ("NVS"), the target DASD including a target cache and target NVS, the steps performed in response to a host read request for data comprising the steps of:
  providing the requested data to the host from the target DASD if the requested data has already been copied from the source DASD, otherwise copying the requested data from the source DASD to the target cache and then providing the requested data to the host from the target cache.

45. The article of claim 36 the source DASD including a source cache and a source non-volatile storage ("NVS"), the target DASD including a target cache and target NVS, the steps performed in response to a host request to write data comprising the steps of:
  writing the requested data from the host to the target cache if completion of the write request does not require data present in the source DASD but not present in the target DASD, otherwise copying the required data from the source DASD to the target cache and then writing the requested data from the host to the target cache.

46. The article of claim 36, the host comprising multiple digital processing apparatuses.

47. The article of claim 36, the host comprising a single digital processing apparatus.

48. The article of claim 36, the source DASD including multiple DASDs.

49. The article of claim 36, the target DASD including multiple DASDs.

50. An article of manufacture comprising a data storage medium tangibly embodying a program of machine-readable instructions executable by a digital processing apparatus to perform method steps for migrating data from a source DASD to a target DASD, the target DASD being coupled to the host and the source DASD being coupled to the target DASD, the source DASD including a source cache and a source non-volatile storage ("NVS"), the target DASD including a target cache and target NVS, said method steps comprising:

receiving an identification of data items contained on the source DASD to be copied to the target DASD;

creating a copy progress map including a listing of each identified data item, the copy progress map including for each data item an indicator denoting whether that data item has been copied from the source DASD to the target DASD;

redirecting requests for access of data contained on the source DASD to the target DASD;

operating the target DASD to repeatedly perform the following steps until all data items have been copied to the target DASD:

selecting a data item whose indicator denotes that said data item has not been copied from the source DASD to the target DASD;

reading the selected data item from the source DASD;

copying the selected data item to the target DASD by copying data stored in the source cache to the target cache and separately copying data stored in the source NVS to the target NVS;

changing the indicator of the data item to denote that said data item has been copied from the source DASD to the target DASD;

satisfying any host data access requests received during the operating step by performing steps comprising:

in response to a host request to read a data item, providing the data item to the host from the target DASD if the data item has already been copied from the source DASD, otherwise, copying the data item from the source DASD to the target DASD, providing the data item to the host from the target cache, and changing indicators corresponding to the copied data item to denote that said data item has been copied from the source DASD to the target DASD; and in response to a host request to write a data item from the host to the target DASD, writing the data item to the target DASD if completion of the write request does not require any data items present in the source DASD but not yet present in the target DASD, otherwise copying the required data items from the source DASD to the target DASD and then writing data from the host to the target DASD and changing indicators corresponding to the copied data items to denote that said data items have been copied from the source DASD to the target DASD.

51. A data storage subsystem, comprising:

a host;

a source DASD, the source DASD including a source cache and a source non-volatile storage ("NVS");

a target DASD electrically coupled to the host and the source DASD, the target DASD including a target cache and target NVS, the target DASD being programmed for:

directing requests for access of data contained on the source DASD to the target DASD;

copying data stored in the source DASD to the target DASD by:

copying items of data stored in the source cache to the target cache; and separately copying items of data stored in the source NVS to the target NVS;

concurrently with the copying steps, operating the target DASD to receive from the host data access requests for access to data stored in the source DASD and in response to said receipt to satisfy the data access requests by performing steps comprising:

in response to a host read request for data, providing the requested data to the host from the target DASD if the requested data has already been copied from the source DASD, otherwise copying the requested data from the source DASD to the target DASD and then providing the requested data to the host from the target DASD; and in response to a host request to write data, writing the requested data from the host to the target DASD if completion of the write request does not require data present in the source DASD but not present in the target DASD, otherwise copying the required data from the source DASD to the target DASD and then writing the requested data from the host to the target DASD.

52. The subsystem of claim 51, further comprising the step of, concurrently with the copying steps, maintaining a copy progress map distinguishing items of data that have been copied from the source DASD to the target DASD from other items of data.

53. The subsystem of claim 52, each item of data comprising a track of data stored on the source DASD.

54. The subsystem of claim 52, the copy progress map comprising a bit map where each bit is associated with a different item of data in the source DASD, the maintaining step comprising the steps of setting each bit of the copy progress map to a predetermined value upon copying the associated data item to the target DASD.

55. The subsystem of claim 54, the predetermined value being a binary zero.

56. The subsystem of claim 54, the predetermined value being a binary one.

57. The subsystem of claim 51, further including the steps of electrically decoupling the source DASD from the host.

58. The subsystem of claim 51, the step of copying items of data stored in the source NVS comprising copying a number of items of data stored in the source NVS to the target cache, and copying a number of items of data stored in the source NVS to the target NVS.

59. The subsystem of claim 51, the source DASD including a source cache and a source non-volatile storage ("NVS"), the target DASD including a target cache and target NVS, the steps performed in response to a host read request for data comprising the steps of:

providing the requested data to the host from the target DASD if the requested data has already been copied from the source DASD, otherwise copying the requested data from the source DASD to the target cache and then providing the requested data to the host from the target cache.

60. The subsystem of claim 51, the source DASD including a source cache and a source non-volatile storage ("NVS"), the target DASD including a target cache and target NVS, the steps performed in response to a host request to write data comprising the steps of:

writing the requested data from the host to the target cache if completion of the write request does not require data present in the source DASD but not present in the target DASD, otherwise copying the required data from the source DASD to the target cache and then writing the requested data from the host to the target cache.

61. The subsystem of claim 51, the host comprising multiple digital processing apparatuses.

62. The subsystem of claim 51, the host comprising a single digital processing apparatus.

63. The subsystem of claim 51, the source DASD including multiple DASDs.

64. The subsystem of claim 51, the target DASD including multiple DASDs.

65. The subsystem of claim 51, the target DASD and host being electrically coupled via a programmable interface, the target DASD and the source DASD also being electrically coupled via the programmable interface.

66. The subsystem of claim 65, the programmable interface comprising an ESCON director.

67. The subsystem of claim 51, the target DASD and host being electrically coupled via a first communications link, and the target DASD and the source DASD being electrically coupled via a second communications link.

68. The subsystem of claim 67 at least one of the first and second communications links comprising a fiber optic link.

69. The subsystem of claim 67, at least one of the first and second communications links comprising a cable having an electrically conductive member.

70. A data storage subsystem, comprising:
   a host;
   a source DASD, the source DASD including a source cache and a source non-volatile storage ("NVS");
   a target DASD coupled to the host and the source DASD, the target DASD including a target cache and target NVS, the target DASD being programmed for:
   receiving an identification of data items contained on the source DASD to be copied to the target DASD;
   creating a copy progress map including a listing of each identified data item, the copy progress map including for each data item an indicator denoting whether that data item has been copied from the source DASD to the target DASD;
   redirecting requests for access of data contained on the source DASD to the target DASD;
   operating the target DASD to repeatedly perform the following steps until all data items have been copied to the target DASD:
   selecting a data item whose indicator denotes that said data item has not been copied from the source DASD to the target DASD; reading the selected data item from the source DASD;
   copying the selected data item to the target DASD by copying data stored in the source cache to the target cache and separately copying data stored in the source NVS to the target NVS;
   changing the indicator of the data item to denote that said data item has been copied from the source DASD to the target DASD; satisfying any host data access requests received during the operating step by performing steps comprising:
      in response to a host request to read a data item, providing the data item to the host from the target DASD if the data item has already been copied from the source DASD, otherwise, copying the data item from the source DASD to the target DASD, providing the data item to the host from the target cache, and changing an indicators corresponding to the copied data item to denote that said data item has been copied from the source DASD to the target DASD, and
      in response to a host request to write a data item from the host to the target DASD, writing the data item to the target DASD if completion of the write request does not require any data items present in the source DASD but not present in the target DASD, otherwise copying the required data from the source DASD to the target DASD and then writing data from the host to the target DASD and changing indicators corresponding to the copied data items to denote that said data items have been copied from the source DASD to the target DASD.

* * * * *